United States Patent

Michon et al.

[15] 3,662,356

[45] May 9, 1972

[54] INTEGRATED CIRCUIT BISTABLE MEMORY CELL USING CHARGE-PUMPED DEVICES

[72] Inventors: Gerald J. Michon, Waterford; Hubert K. Burke, Schenectady, both of N.Y.

[73] Assignee: General Electric Company

[22] Filed: Aug. 28, 1970

[21] Appl. No.: 67,747

[52] U.S. Cl. .......... 340/173 FF, 307/238, 307/279, 317/235 R

[51] Int. Cl. .......... G11c 11/24, G11c 11/40

[58] Field of Search .......... 340/173 FF; 307/238

[56] References Cited

UNITED STATES PATENTS 3,588,846 6/1971 Linton .......... 340/173

*Primary Examiner*—Terrell W. Fears

*Attorney*—Paul A. Frank, John F. Ahern, Julius J. Zaskalicky, Louis A. Moucha, Frank L. Neuhauser, Oscar B. Waddell and Joseph B. Forman

[57] ABSTRACT

An integrated circuit of the bistable memory cell type utilizes two charge-transfer active elements to provide the load resistor function in a cross-coupled MOS transistor flip-flop arrangement of the memory cell. The charge-transfer element is a pulse-activated current generator formed from the substrate common to the memory cell circuit, an n- or p-type doped region diffused therein, an insulating gate layer, and a patterned conducting gate layer common to both elements. The series circuit connection of each active MOS transistor and its associated charge-transfer element is through the respective doped region which is common thereto.

12 Claims, 5 Drawing Figures

Inventors:
Gerald J. Michon,
Hubert K. Burke,
by Louis A. Moncha

Inventors:
Gerald J. Michon,
Hubert K. Burke,
by Louis A. Moncha

INTEGRATED CIRCUIT BISTABLE MEMORY CELL USING CHARGE-PUMPED DEVICES

Our invention relates to a bistable memory cell which can be fabricated in an array using integrated circuit technology, and in particular, to a cross-coupled flip-flop circuit employing charge-transfer active elements to provide the load resistor function in the flip-flop.

Various types of conventional MOS memory cells are now being fabricated in arrays using integrated circuit technology for purposes of storage for digital information. A typical MOS memory cell of the "static" type comprises a cross-coupled flip-flop with two drain-gate connected metal oxide semiconductor field-effect transistors (MOS transistors) serving as static load resistors for the two active MOS transistors in the circuit. A disadvantage of the static type MOS memory cell is that the load devices must be made significantly higher in impedance than the impedance of the active transistors to ensure stability and reduce power requirements. The higher impedance load devices are physically quite long and consume a significantly large area when fabricated by integrated circuit technology on a suitable semiconductor substrate such as lightly doped n- or p-type silicon. An advantage of the static type MOS memory cell is that it is unconditionally bistable, that is, retains its state indefinitely when unaddressed. The MOS memory cell area can be reduced by utilizing a conventional MOS memory cell of the dynamic type. This latter type memory cell is bistable while being addressed, but has the disadvantage that stability is lost unless the circuit is periodically readdressed and therefore suffers a lower system performance than the static cell. Thus, the smaller memory cell area of the conventional dynamic MOS memory cell is obtained at the expense of system complications which are required to maintain the cell in its bistable state, that is, to retain information storage.

Therefore, one of the principal objects of our invention is to provide a new and improved MOS memory cell which combines the bistability and small area advantages of static and dynamic MOS memory cells, respectively.

Another object of our invention is to fabricate our improved memory cell using integrated circuit technology.

A further object of our invention is to provide a new pulse-activated current generator integrated circuit element.

In accordance with our invention, we provide a new bistable memory cell which can be fabricated in an array using integrated circuit technology and which utilizes two charge-transfer active elements in place of the static load resistor transistors employed in conventional cross-coupled flip-flop arrangements of the static memory cell. The charge-transfer elements and a pair of active MOS transistors are formed on a common substrate and each charge-transfer element includes an n- or p-type doped region diffused or otherwise formed within the substrate, an insulating gate layer, and a first patterned conducting gate layer which is common to both charge-transfer elements. The charge-transfer element utilizes a charge-pumping phenomenon whereby electric charge is transferred across a reverse biased semiconductor junction, and application of a repetitively pulsed voltage to the gate electrode of the element causes a current flow of magnitude dependent on the the magnitude and frequency of the applied voltage. The series circuit connection of each MOS transistor and its associated charge-transfer element is through the respective doped region which is common thereto. Thus, in a single memory cell there are first and second doped regions common to the first and second active MOS transistors and their associated charge transfer elements, and a third doped region common to the two active MOS transistors. Second and third patterned conducting layers provide the cross-coupling between the active transistor gates and cell circuit nodes.

The features of our invention which we desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character and wherein:

Figure 1:
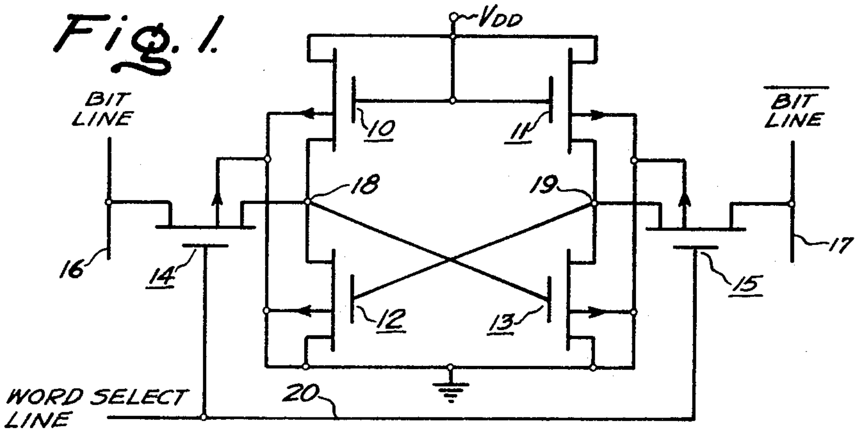
FIG. 1 is a schematic representation of a prior art MOS memory cell of the static type.

Referring now in particular to FIG. 1, there is shown a conventional MOS memory cell of the static type which comprises a cross-coupled flip-flop having two drain-gate connected MOS transistors 10 and 11 serving as static load resistors for the two active MOS transistors 12 and 13, respectively. The four MOS transistors 10, 11, 12 and 13 are of the same conductivity type and are here illustrated as being p-channel devices so that the drain and gate electrodes of the static load resistor transistors 10 and 11 are connected to a common source of negative d-c supply potential $-V_{DD}$. A memory cell of the same type using all n-channel devices is realized provided that the polarities are reversed, and the use of n-channel and p-channel devices connected in complementary fashion is also possible for this type memory cell, and thus our invention depicted schematically in FIG. 3 using only p-channel devices is not limited thereby, and can also be utilized with all n-channel devices or n-channel and p-channel devices connected in complementary fashion. A third pair of MOS transistors 14 and 15 comprise the accessing elements which address the memory cell and have their load terminals (drain and source electrodes) connected to the circuit nodes and data lines. Thus, transistor 14 has its load terminals connected to a first bit line 16 and circuit node 18 (juncture of the source electrode of transistor 10 and the drain electrode of transistor 12). In like manner, transistor 15 has its load terminals connected to the complementary $\overline{\text{bit}}$ line 17 and node 19 (juncture of the source electrode of transistor 11 and the drain electrode of transistor 13). The gate electrodes of the accessing transistors 14, 15 are connected to a word select line 20 which is supplied with word select signals at two potential levels for turning the accessing transistors on or off, that is, word select line 20 is energized to turn on transistors 14 and 15 whenever the particular memory cell is selected for reading (read-out) or writing (storing) operations. The accessing or addressing of the memory cell may be done in a variety of ways other than that illustrated in FIG. 1 as is well known in the art. A suitable sense circuit (not shown) in the data lines 16 and 17 senses the current level in such lines during the reading operation. Since our invention is directed essentially to the new memory cell component enclosed within the dashed line in FIG. 3, the current level sensing circuit, the distinctions between the reading and writing operations, and the accessing transistor circuitry which are all well known in the art, will not be described here.

The operation of the FIG. 1 static type MOS memory cell may be briefly described as follows: The memory cell is a cross-coupled flip-flop circuit which includes two parallel branches each having an active MOS transistor and a static MOS transistor (load resistor) connected in series circuit relationship between a supply potential $-V_{DD}$ applied to the gates of the static transistors 10, 11 and a common potential (ground) for the source electrodes of the active devices 12, 13 and the substrate. The circuit nodes 18 and 19 are cross-connected to the gate electrodes of the opposite active transistors 13 and 12, respectively, whereby one of the active devices is "on" while the other device is "off", and changing the state of one such device causes the other device to assume the opposite state due to the regenerative action provided by the cross-coupling thereby providing two stable states for bit storage. The feature of this memory cell in being unconditionally bistable (retaining its state indefinitely when unaddressed) is readily obvious and highly desirable. However, in order to ensure the stability and also to reduce power requirements, the load devices 10, 11 must be significantly higher in impedance than devices 12 and 13 which results in devices 10 and 11 being physically quite long and large in area when fabricated on a semiconductor substrate such as p- or n-type silicon. Conversely, devices 10, 11 may be small in area, and devices 12, 13 made significantly wider to ensure stability (but increasing power requirements), this latter approach again resulting in the consumption of large area (this time for devices 12, 13).

Figure 2:
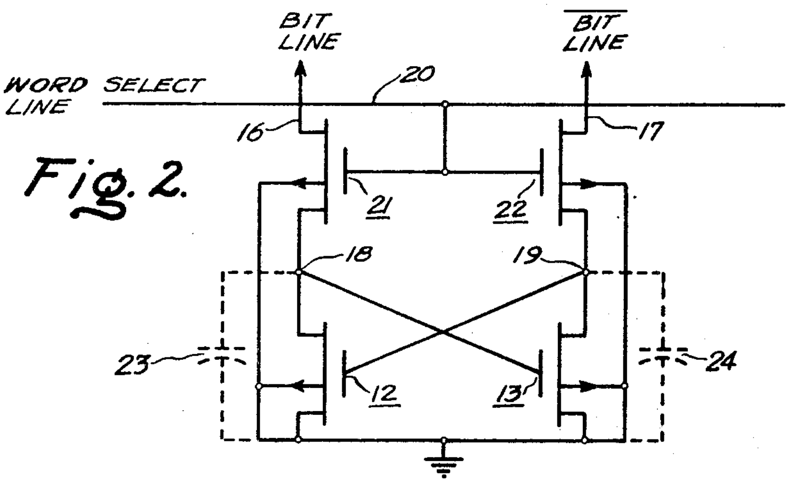
FIG. 2 is a schematic representation of a prior art MOS memory cell of the dynamic type.

Since the chief advantage in using integrated circuit technology is to reduce the volume of the materials required to obtain the various circuit functions, it is apparent that it would be highly desirable to obtain an MOS memory cell having a reduced area compared to that of the static type memory cell illustrated in FIG. 1. One means for obtaining a reduced area MOS memory cell is to utilize a dynamic type memory cell as illustrated in FIG. 2. The FIG. 2 memory cell is also a cross-coupled flip-flop utilizing the active device MOS transistors 12, 13 as in the FIG. 1 embodiment, but utilizing active device MOS transistors 21 and 22 to perform both the accessing and load resistor functions. The word select line 20 is connected to the gate electrodes of transistors 21 and 22, and the load terminals of transistors 21 and 22 are connected to the data lines 16, 17 and to the circuit nodes 18 and 19 as are the accessing transistors in the FIG. 1 embodiment. Thus, the dynamic memory cell of FIG. 2 is seen to be the static memory cell of FIG. 1 without the area consuming load resistor devices 10, 11. The FIG. 2 memory cell is bistable as long as it is being addressed under readout bias conditions, that is, the word select line 20 is supplied with word select signals for maintaining transistors 21 and 22 in the conducting state and bias voltage is applied to the bit lines 16, 17. When unaddressed, the FIG. 2 circuit retains temporary stability by virtue of parasitic capacitance 23, 24 (shown in dashed form) at the circuit nodes. Gradual discharge of these capacitors by leakage current causes loss of circuit stability unless the cell is readdressed or by the addition of suitable circuit means. The omission of the load resistors in the dynamic memory cell of FIG. 2 thus desirably achieves a lower memory cell area, but at the expense of lower system performance. The system performance can obviously be increased by added circuitry to maintain stability and thereby maintain information storage in the memory cell, but this obviously increases the memory cell area.

Figure 3:
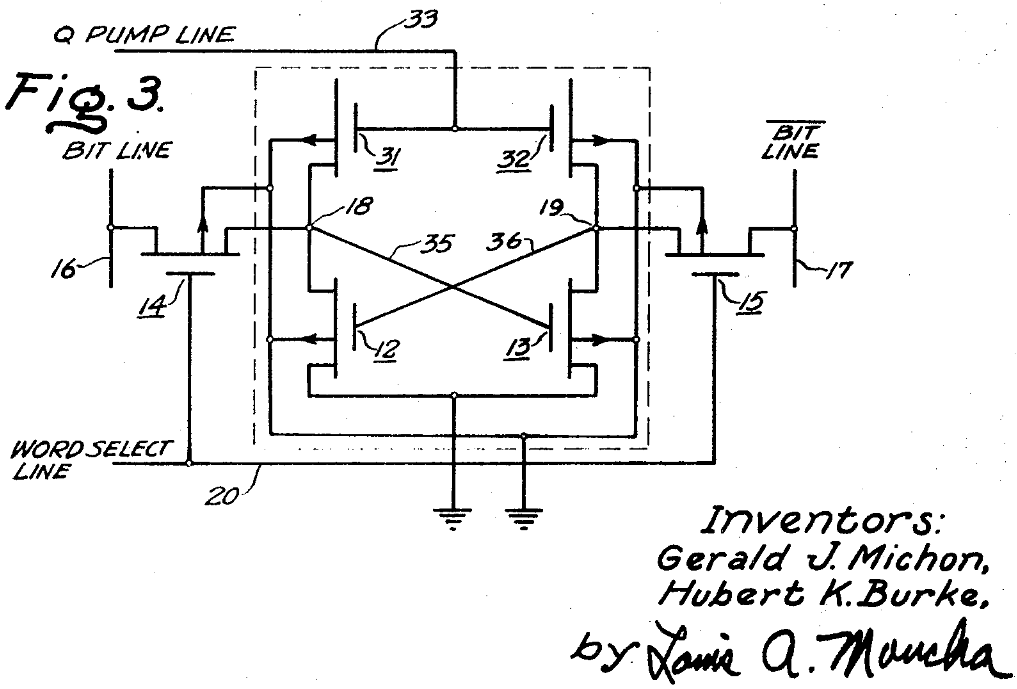
FIG. 3 is a schematic representation of the MOS memory cell constructed in accordance with our invention.

The significance of our invention, depicted schematically in FIG. 3, is that it provides the stability and small area advantages of both the static and dynamic memory cell circuits illustrated in FIGS. 1 and 2. It should be noted that the FIGS. 1 and 3 circuits closely resemble each other schematically. The distinctions between the FIGS. 1 and 3 circuits is in our use of a pair of what may be described as charge-pumped (Q-pumped) load resistor active devices 31, 32 for the static load resistor devices 10, 11 in FIG. 1, and the use of an a-c or other pulsed type voltage signal for energizing the charge-pumped devices. It should be observed that the charge-pumped devices depicted in FIG. 3 are of the p-channel type and that each utilizes only one p-type doped region diffused or otherwise formed in the substrate. As stated previously, devices 31, 32 may also be of the n-channel type with appropriate reversal of voltage polarity. The pulsed (charge-pumping) voltage for energizing devices 31, 32 and thereby controlling the resistance thereof, is applied to the gate electrodes thereof by means of the Q-pump line 33. The peak magnitude of the Q-pump line voltage must exceed the threshold voltage of devices 31, 32 and in the case of p-channel type devices, is of negative polarity.

The charge-pumping phenomenon has been described in an article "Charge Pumping In MOS Devices" by J.S. Brugler and P.G. Jespers in IEEE Transistions on Electron Devices, Vol. ED–16, pps. 297–302, March 1969, but application of this phenomenon has been very limited. The charge-pumping phenomenon produces a controlled transfer of electrical charge (electrons or holes) across a reverse biased semiconductor junction by means of a field-effect structure similar to the MOS transistor but employing only a single doped region diffused in the substrate. A repetitive charge transfer develops a controlled current flow which can be used in many circuit applications, and in particular, the mechanization of physically small devices which function as relatively high resistance value resistors for use in an integrated circuit structure such as the subject MOS memory cell. In view of this fact, the charge-transfer (charge-pumped) active devices described herein may be described as current generators or (load) resistors.

Operation of the charge-pumped load resistor will be described prior to the description of the detailed structure of the MOS flip-flop memory cell incorporating a pair of such active resistors. Basically, the charge-pumped resistor consists of a semiconductor substrate, a source (opposite conducting type doped region in the substrate), an insulating gate layer, and a conducting gate layer having a gate terminal or electrode connected thereto. With reference to a p-channel type construction, application of a negative voltage to the gate electrode in excess of the threshold voltage causes a p-channel to be formed in the substrate under the gate electrode as in conventional MOS transistors, the positive charge necessary to form the channel being supplied by the source (p-region). A subsequent switching of the gate voltage to a value less than the threshold voltage causes the charge to begin to flow from the channel back to the source. As the channel charge is reduced, channel conductivity decreases, and at some point where the distributed channel time delay (caused by distributed conductance and capacitance) is longer than the turn-off time of the gate voltage, some of the channel charge cannot return to the source region before the channel is cut off, and such charge becomes trapped under the gate and remains as substrate charge. A charge component, in addition to the hereinabove "geometric" component, is transferred from the source via the channel to the substrate through a mechanism attributed to "fast" surface state density, each time the device is switched from its conducting to nonconducting state. The result of the gate voltage being switched above and below the threshold voltage thus causes some charge to be transferred (pumped) from the source region to the substrate, and if the gate voltage is switched at a constant repetition rate, the charge flow per voltage cycle results in a source-to-substrate current, the magnitude of current being dependent on channel geometry, gate turn-off time, applied voltage magnitude and frequency and number of fast surface states in the channel region. Thus, when utilizing the aforementioned source (p-region) as a circuit node (18, 19) a current generator from the circuit node to the substrate is formed and can be used as a load resistor in our memory cell. In FIG. 3, an alternating or pulsating negative voltage of controlled frequency and magnitude in excess of the threshold voltage is supplied from a suitable source to line 33 which may be described as the charge or Q-pump line. Q-pump line 33 is connected to the gate electrodes of the charge-pumped devices 31, 32 and the gate voltage pulsations cause the aforementioned trapping or pumping of charge in the (common) substrate and resultant current flow from the circuit nodes 18, 19 to substrate. Since the magnitude of the node-to-substrate currents in devices 31, 32 is readily controlled by controlling the frequency or repetition rate of the voltage applied to Q-pump line 33, it should be obvious that our application of the charge-pumping phenomenon in a bistable memory cell produces an integrated circuit structure which is an equivalent resistor, and in particular, can produce a high resistance value resistor to thereby reduce circuit cost due to the much smaller physical size thereof as well as provide improved circuit performance due to the resistance being readily controlled by controlling the voltage applied to line 33. Thus, our bistable memory cell invention also provides a basic improvement in integrated circuit resistor technology.

Referring now to the plan view of FIG. 4, which represents the elements enclosed in dashed lines in FIG. 3, and to the perspective view of FIG. 5, a cross section along line 5–5 in FIG. 4, the physical structure of our charge-pumped memory cell will now be described. The structure will be described using all p-channel devices, it being understood, as described hereinabove, the use of all n-channel devices or n-channel and p-channel devices connected in complementary fashion is within the teaching of our invention.

The substrate supporting our memory cell component may be any suitable material, but preferably, the substrate is the semiconductor material used in the four interconnected devices 12, 13, 31, 32 forming the memory cell. Thus, a substrate 40 of n-type semiconductor material such as lightly doped n-type silicon supports our memory cell. Substrate 40 has three heavily doped p-type regions 41, 42, 43 diffused or otherwise formed therein, and indicated by the dashed outlines in FIG. 4. The p-region 41 is common to charge-pumped device 32 and MOS transistor 13 and forms the source for device 32 and drain for transistor 13. In like manner, p-region 42 is common to devices 31 and 12 and forms the source and drain thereof, respectively. P-region 43 is common to MOS transistors 12, 13 and forms the sources thereof. An insulator layer 44 of a suitable material such as silicon dioxide is deposited or otherwise formed over the substrate 40 covering the entire top (except the regions of circuit nodes 18, 19 to obtain the cross connection to the p-regions) surface thereof in a thin film or layer in certain of the areas and a thick film or layer in the other areas as seen more clearly in FIG. 5. The electrically insulating layer 44 is of greater thickness above the regions of the semiconductor substrate which are not to be activated by the circuit operation such as along and adjacent the edges (except for the interconnections to the accessing transistors and adjacent memory cells) and a central region which separates the four devices 12, 13, 31, 32 into two series circuits 12, 31 and 13, 32. A first patterned electrical conductor layer or plate 34 is deposited or otherwise formed on insulating layer 44 for forming the gates of devices 31, 32 which are connected to the Q-pump line 33 supplied with the negative voltage for energizing such devices. In the case of an array of our memory cells, conductor plate 34 is a continuous member common to all of the charge-pumped devices in the array (i.e. including all the rows and columns of interconnected memory cells). As depicted more clearly in FIG. 5, conductor plate 34 is not a planar element since it extends over portions of both the thin and thick oxide film 44. In particular, plate 34 extends over the portion **44*a* of the thick oxide film in the central region of the memory cell which separates the four active devices 12, 13, 31, 32 into two series circuits 12, 31 and 13, 32. Conductor plate 34 preferably slightly overlaps a first edge portion of the p-regions 41 and 42 (although the memory cell will operate if such first edges 41*a*, 42*a* of the p-regions are approximately beneath the inner long edge of plate 34). The two regions of plate 34 which are in communication with p-regions 41, 42 extend over portions of the thin oxide film and constitute the gates of charge-pumped devices 31, 32. In the preferred embodiment of our memory cell, layer 34 is a rectangular figure in a plan view of the cell, for ease of fabrication. Obviously, the patterned conducting gate layer 34 (and layers 35, 36) may have other shapes, as desired. As stated hereinabove, the p-region 41 provides the series circuit coupling between charge-pumped device 32 and transistor 13 whereas p-region 42 couples device 31 and transistor 12**.

The cross-coupling between circuit nodes 18 and 19 and the gates of transistors 13 and 12, respectively, is obtained by means of second and third patterned conducting layers 35 and 36. Conducting layers 35, 36 may be formed on the insulating layer 44 by the same technique as used for layer 34. A first end of layer 35 terminates at approximately the center of p-region 42 and establishes circuit node 18. The second end of layer 35 forms the gate of MOS transistor 13, and is of sufficient width to communicate with p-regions 41 and 43. To insure that layer 35 completely covers the thin oxide film between regions 41 and 43, the second end of layer 35 is extended to overlap a portion of the thick oxide film region **44*a*, as illustrated. Except for the two ends of layer 35 (and a short length 35*a* which traverses p-region 43), the major portion of conductor layer 35 is formed adjacent approximately one-half the periphery of the memory cell and thus is formed over the thick film portion of insulator layer 44. Conductor layer 36 is considerably shorter in length than layer 35, and has a first end contacting approximately the center of p-region 41 and establishes circuit node 19. The second end of layer 36 forms the gate of MOS transistor 12, is of sufficient width to communicate with p-regions 42 and 43, and may extend in overlapping relationship with a portion of the thick oxide film, as illustrated. The central portion of conductor layer 36 is formed over the thick film region 44a which separates devices 12, 13, 31, 32 into the two series circuits. Conductor layers 34, 35 and 36 are spaced from each other to ensure that no short-circuiting occurs between any adjacent pair of such conductors and that the only coupling between such conductors is through the p-regions associated therewith. A suitable terminal is formed on conductor layer 34** for connection of such point to the external charge-pumping voltage source.

Figure 4:
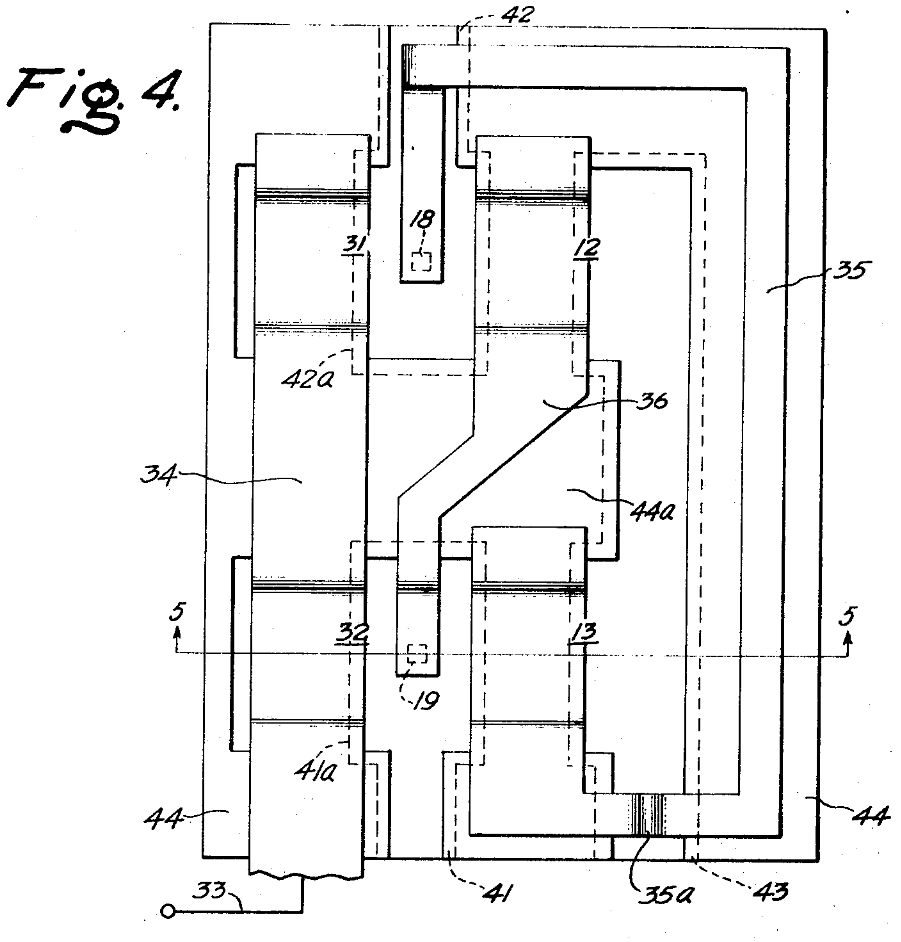
FIG. 4 is a plan view of the memory cell of FIG. 3 shown enclosed in dashed line therein.

It should be noted in FIG. 4 that p-region 42 in the substrate 40 extends to the upper edge and p-regions 41, 43 extend to the lower edge of the memory cell as viewed by the observer. The extension of p-regions 41, 42 to the edges provide the necessary coupling (p-region in this particular embodiment) to the accessing transistors 14 and 15 which would be formed on the same substrate 40 adjacent the upper and lower edges thereof. The extension of p-region 43 provides the common connection to either adjacent memory cells, or the external common electrode (to ground). Thus, a load terminal of accessing transistor 14 is connected to circuit node 18 by means of the p-region 42 extended past the upper edge of the memory cell in FIG. 4 whereas a load terminal of accessing transistor 15 is connected to circuit node 19 by means of p-region 41 extended past the lower edge of the memory cell. The width of the p-regions 41, 42, 43 at the edges (and adjacent thereto) of the memory cell is less than in the vicinity of the circuit nodes to assure adequate spacing from the conductor layers 34, 35, 36 in the regions wherein the substrate is not to be activated.

Although a single memory cell has utility, such cells are more often fabricated in an array by forming a plurality of memory cells and their associated accessing transistors in an array of rows and columns (i.e., an *x–y* pattern) on a single substrate having each of a plurality of word select lines common to a particular row of memory cells and accessing transistors, whereas each column is common to a particular pair of a plurality of pairs of data lines 16 and 17.

As an example of a small area on a substrate surface utilized by one of our memory cells, and not by way of limitation, typical dimensions of the complete integrated circuit depicted in FIG. 3 (including the accessing transistors) are 0.003 inches by 0.004 inches. In contrast, typical dimensions for the complete circuit depicted in FIG. 1 are 0.005 inches by 0.006 inches. Thus, it is evident that our invention produces a memory cell which occupies a very small area on the substrate and is considerably smaller than the area occupied by the conventional memory cell of the static type, and yet it has the major advantage of such static type memory cell in that it is unconditionally bistable, an advantage not possessed by the conventional dynamic type memory cell. Our charge-pumped devices 31 and 32 replace the load resistors 10 and 11 in the conventional static type memory cells but are not resistors as such. More properly, they are alternating current, or pulse-activated current generators. Our memory cell circuit, as depicted schematically in FIG. 3, is dependent for stable operation on the Q-pump line 33 in the same manner as the conventional static memory cell circuit depends upon a d-c power supply line. Hence, no synchronism is required between our Q-pump line 33 and the word select line 20, and our circuit is truly static in operation.

Another significant feature of our circuit is its inherently low standby power. While the actual power required to sustain the node voltage of any MOS flip-flop is very low (as established by the very low leakage currents of the reverse biased, diffused regions), it has not been possible in practice to attain this low power without unwanted side effects. Without elaborating on various current approaches to power reduction, it can be stated that our memory cell has potentially the lowest power requirement of any other, save one, the complementary MOS, which due to processing complexity and area requirements is not an economical competitor in memory applications.

Figure 5:
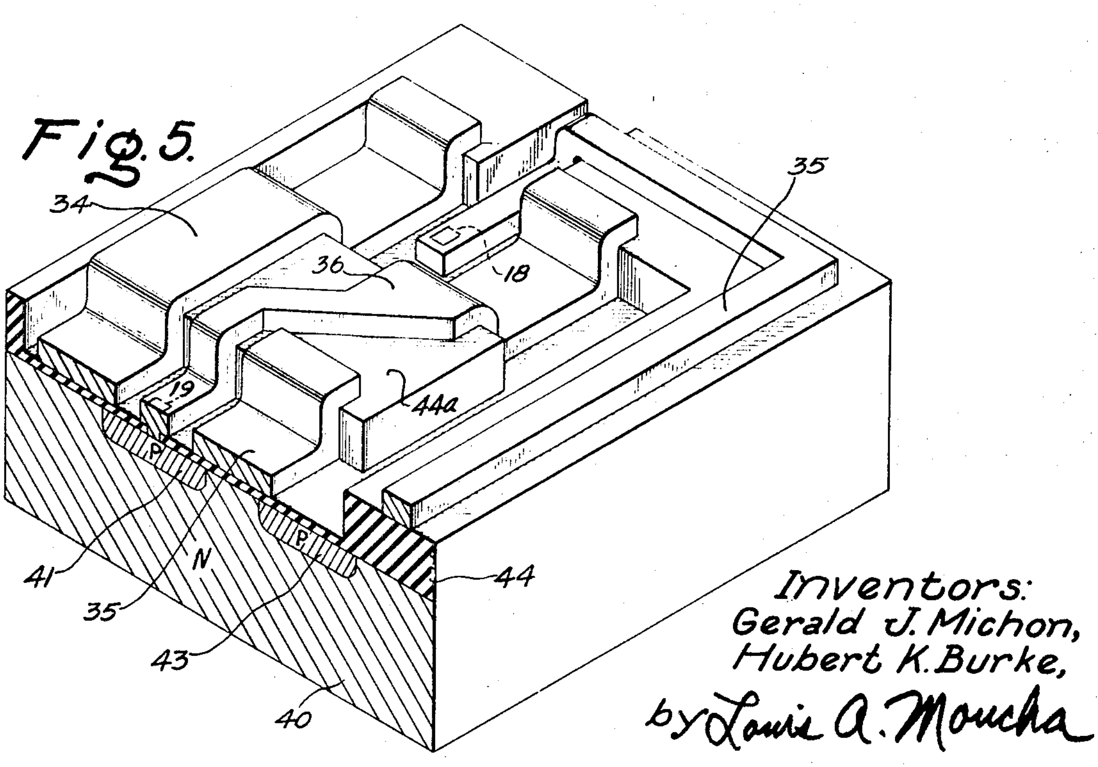
FIG. 5 illustrates in perspective the memory cell of FIG. 4 in cross section taken along lines 5—5.

Having described a p-channel embodiment of our charge-pumped device memory cell, it should be obvious that such cell may readily be fabricated as an n-channel type (with appropriate voltage polarities) or an n-channel and p-channel type device circuit connected in complementary fashion (with appropriate changes in connections), and that the interconnecting conductors 35 and 36, in particular, may be arranged in different patterns from that illustrated in FIGS. 4 and 5. Also, our devices 12, 13, 31, 32 are not limited to any specific metal oxide semiconductor type, and may be any metal or nonmetal conducting layer-oxide or nonoxide insulating layer-semiconductor type used in the integrated circuitry art. Also, the sources of devices 31 and 32 need not be respectively common with the drains of transistors 12 and 13, and thus could be separate doped regions interconnected by suitable patterned electrical conductors. Finally, although the substrate and sources of transistors 12, 13 are illustrated as being at the same potential (ground or zero volts in FIG. 3), they can be at unequal voltages, as dictated by the circuit requirements. Thus, while our invention has been particularly shown and described with reference to one illustrated embodiment thereof, it should be understood by those skilled in the art that various changes in form and detail may be made therein without departing from the spirit and scope of the invention as defined by the following claims.

What we claim as new and desire to secure by Letters Patent of the United States is:

1. In a bistable memory cell suitable for fabrication by integrated circuit technology comprising first and second conducting layer-insulating layer-semiconductor field-effect transistors each having a drain electrode cross coupled to the gate electrode of the other transistor and having source electrodes connected to a common potential, and third and fourth conducting layer-insulating layer-semiconductor field-effect charge-transfer active devices having source electrodes connected respectively to the drain electrodes of said first and second transistors and having gate electrodes adapted to be connected to a source of repetitive variable voltage having a peak magnitude exceeding the threshold voltage of said charge-transfer devices, said third and fourth charge-transfer devices each having only a single doped region, a resultant switching of the charge-transfer devices gate voltage above and below the threshold voltage in response to the repetitive variable voltage causing transfer of charge from the source electrodes thereof to the semiconductor regions thereof to thereby develop currents of magnitude dependent on the frequency of the gate applied voltage.

2. In the bistable memory cell set forth in claim 1 and further comprising accessing means connected to a first circuit node defined by the drain-source juncture of the first transistor and third charge-transfer device and to a second circuit node defined by the drain-source juncture of the second transistor and fourth charge-transfer device for addressing the memory cell.

3. In the bistable memory cell set forth in claim 1 wherein said first transistor and said third charge-transfer device are of the same conductivity type, and said second transistor and said fourth charge-transfer device are of the same conductivity type.

4. In the bistable memory cell set forth in claim 1 wherein said first and second transistors and said third and fourth charge-transfer devices are all of the same conductivity type.

5. In the bistable memory cell set forth in claim 4 wherein said first and second transistors and said third and fourth charge-transfer devices are of the p-conductivity type.

6. In the bistable memory cell set forth in claim 4 wherein said first and second transistors and said third and fourth charge-transfer devices are of the n-conductivity type.

7. In the bistable memory cell set forth in claim 1 wherein said first and second transistors and said third and fourth charge-transfer devices are formed on a common semiconductor substrate, the single doped regions of said third and fourth charge-transfer devices are formed in the substrate and form the source electrodes of the charge-transfer devices.

8. In the bistable memory cell set forth in claim 7 wherein a first and second of the doped regions of said third and fourth charge-transfer devices also respectively forming the drain electrodes of said first and second transistors to thereby provide the charge-transfer device source electrode to transistor drain electrode connections.

9. In the bistable memory cell set forth in claim 8 wherein said first and second transistors having a common third doped region formed in the substrate, the third doped region forming the source electrodes of the first and second transistors, the first, second and third doped regions being spaced from each other and being of the same conductivity type.

10. In the bistable memory cell set forth in claim 9 wherein an insulating layer overlying a surface of the substrate, a first patterned conducting layer overlying a first portion of the insulating layer and having a first end formed through the insulating layer and contacting the first doped region and having a second end overlying a substrate region separating the second and third doped regions to thereby form the gate electrode of the second transistor, the first patterned conducting layer providing the coupling of the drain electrode of the first transistor to the gate electrode of the second transistor, and a second patterned conducting layer overlying a second portion of the insulating layer and having a first end formed through the insulating layer and contacting the second doped region and having a second end overlying a substrate region separating the first and third doped regions to thereby form the gate electrode of the first transistor, the second patterned conducting layer providing the coupling of the drain electrode of the second transistor to the gate electrode of the first transistor.

11. In the bistable memory cell set forth in claim 10 wherein a third patterned conducting layer overlying a third portion of the insulating layer which overlies portions of the first and second doped regions to thereby form the gate electrodes of said third and fourth charge-transfer devices.

12. A charge-pumped active resistor device suitable for fabrication by integrated circuit technology comprising a semiconductor substrate, a single doped region of conductivity type opposite that of said substrate and formed therein, an insulating gate layer formed over the substrate and doped region, and a conducting gate layer formed over a portion of the insulating gate layer which is in communication with the doped region, said conducting gate layer provided with terminal means adapted for connection to a source of repetitive variable voltage having a peak magnitude exceeding the threshold voltage of the charge-pumped device, a resultant switching of the charge-pumped device gate voltage above and below the threshold voltage in response to the repetitive variable voltage causing transfer of charge from the doped region to the semiconductor substrate to thereby generate a doped region-to-substrate current of magnitude dependent on the frequency of the gate applied voltage, the variable current generating ability of the charge-pumped device thereby producing an equivalent active resistor device which may be controlled and have high resistance value for a small physical size of the device.

* * * * *